United States Patent [19]
Norris

[11] Patent Number: 5,870,633
[45] Date of Patent: Feb. 9, 1999

[54] PHOTOGRAPHIC APPARATUS AND METHOD

[76] Inventor: Philip R. Norris, 240 Elm St., North Reading, Mass. 01864

[21] Appl. No.: 808,040

[22] Filed: Mar. 4, 1997

Related U.S. Application Data

[63] Continuation-in-part of Ser. No. 738,772, Oct. 29, 1996.

[51] Int. Cl.⁶ .................................................. G03B 17/52
[52] U.S. Cl. .............................. 396/33; 396/32; 430/498
[58] Field of Search .................................. 396/31, 32, 33, 396/35, 38, 40, 41, 30; 430/500, 498

[56] References Cited

U.S. PATENT DOCUMENTS

| | | | |
|---|---|---|---|
| 2,854,903 | 10/1958 | Land et al. | 396/33 |
| 2,930,301 | 3/1960 | Land et al. | 396/32 |
| 3,079,849 | 3/1963 | Wareham | 396/583 |
| 3,270,653 | 9/1966 | Bachelder | 396/33 |
| 3,405,619 | 10/1968 | Land | 396/31 |
| 3,455,692 | 7/1969 | Bachelder et al. | 430/500 |
| 3,636,845 | 1/1972 | Harvey | 396/32 |
| 3,643,570 | 2/1972 | Reid et al. | 95/18 |
| 3,673,939 | 7/1972 | Harvey | 95/13 |
| 3,754,917 | 8/1973 | Harvey | 96/76 |
| 3,767,405 | 10/1973 | Harvey | 430/498 |
| 3,852,781 | 12/1974 | Erlichman | 396/33 |
| 3,939,483 | 2/1976 | Kuramoto et al. | 396/30 |
| 4,114,166 | 9/1978 | Driscoll et al. | 396/33 |
| 4,132,471 | 1/1979 | Svatek et al. | 396/39 |
| 4,172,647 | 10/1979 | Gold | 396/39 |
| 4,855,769 | 8/1989 | Slavitter et al. | 396/33 |
| 5,103,249 | 4/1992 | Keene | 396/32 |
| 5,453,804 | 9/1995 | Norris et al. | 396/31 |

FOREIGN PATENT DOCUMENTS

| | | |
|---|---|---|
| 26 57 423 A1 | 12/1976 | Germany . |
| 52-44629 | 4/1977 | Japan . |
| 63-103220 | 5/1988 | Japan . |

*Primary Examiner*—A. A. Mathews
*Attorney, Agent, or Firm*—Leslie Payne

[57] ABSTRACT

An improved camera and method of processing for use with an associated film assemblage of the self-developing type, wherein the assemblage is provided with a plurality of self-developing film frames are disclosed. Each frame carries an integral self-developing unit as well as an associated processing fluid pod. Each exposed frame is manually pulled through pressure applying members for rupturing the pod and spreading the fluid before exiting. Simultaneously, the next successive film unit is pulled from a container therefor and indexed by means on the assemblage to the film plane as the pulled unit is automatically separated from the remainder of the assemblage.

12 Claims, 8 Drawing Sheets

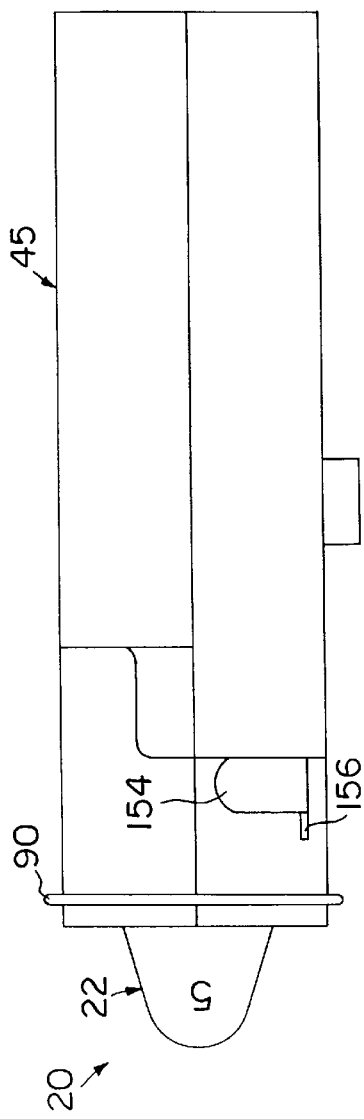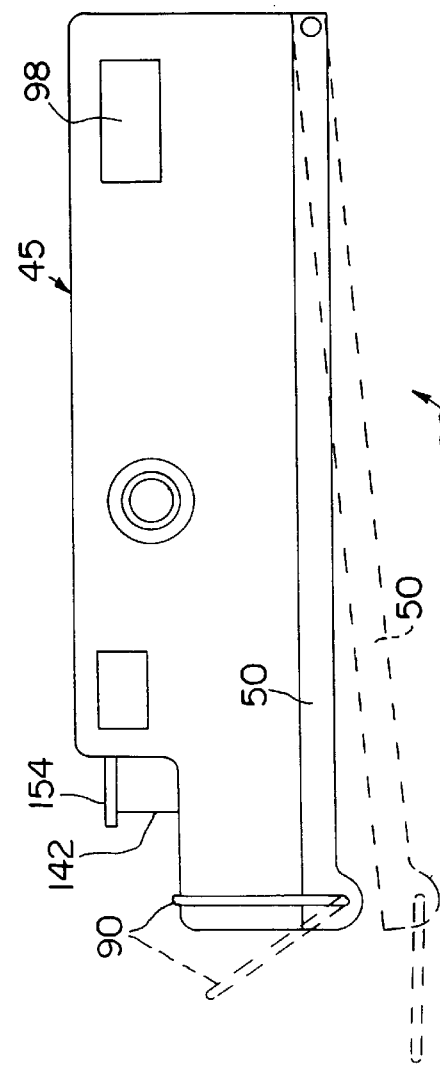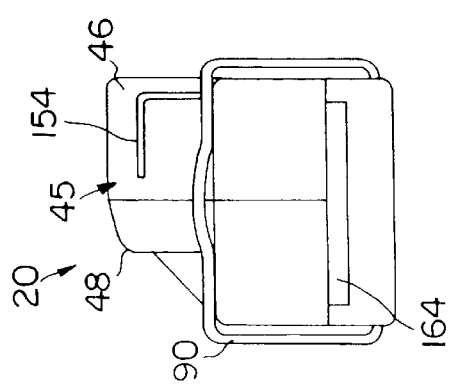

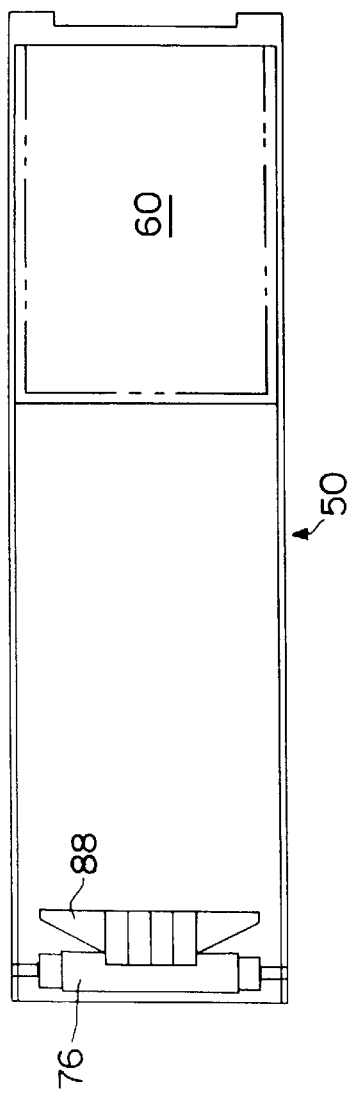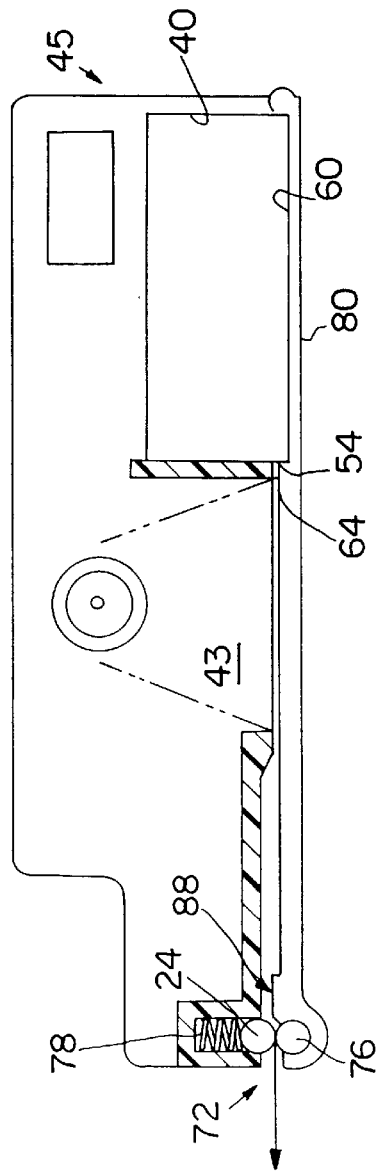

PHOTOGRAPHIC APPARATUS AND METHOD

CROSS-REFERENCE TO RELATED APPLICATIONS

The present invention is a continuation-in-part application of commonly-assigned and copending application entitled "Dual Exposure Photographic Apparatus And Method", filed in the U.S. Patent and Trademark Office on Oct. 29, 1996 and having Ser. No. 08/738,772, and is related to commonly-assigned and copending application Ser. No. 60/040,254 and commonly-assigned and copending application Ser. No. 60/040,797.

BACKGROUND OF THE INVENTION

The present invention relates generally to photographic apparatus and, more particularly, to compact photographic apparatus of the self-developing type and methods of operation thereof.

Heretofore, a wide variety of photographic apparatus of the self-developing type for exposing and processing film units have been proposed. Exemplary photographic apparatus of this type are described and illustrated in the following U.S. Pat. Nos.: 2,854,903; 2,930,301; 3,079,849; 3,270,653; 3,405,619; 3,455,692; 3,767,405; 3,852,781; 4,114,166; 4,132,471; 4,172,647; 4,855,769; 5,103,249; and, 5,453,804. Typically, such cameras use self-developing film assemblages of either the peel-apart or integral kind. Cameras of the above type are cooperable with film systems whereby the film frames are driven from the camera by some internal mechanism or are manually withdrawn by an operator exerting a pulling force on a film strip. During such film advance, the film frames engage pressure applying mechanisms whereby the latter act to rupture pods containing processing fluid on the frames and then spread the latter over the film unit in order to initiate processing of the latent image.

While such cameras are commercially successful and operate in a reliable manner, there is nevertheless a continuing desire for providing a low cost camera of the above type, especially one which is compact in size and is otherwise adapted for use with a film assemblage that is correspondingly compact in size.

SUMMARY OF THE INVENTION

In accordance with the present invention provision is made for a method of processing a film assemblage including a plurality of individual self-developing integral film units carried serially in spaced apart relationship on a strip in a photographic apparatus. In an illustrated embodiment, the method comprises the steps of applying a withdrawing force on a leading portion of the strip so that an exposed film unit at the exposure station is first advanced through pressure applying means within the photographic apparatus and then emerges from the photographic apparatus. Generally simultaneously therewith the next successive integral film unit is indexed to the exposure station.

In an illustrated embodiment, provision is made for the indexing step being accomplished by indexing means provided on the strip cooperating with the pressure applying means in the photographic apparatus.

In still another illustrated embodiment, provision is made for each processing fluid pod serving as the indexing means for engaging the pressure applying means. Each of the pods is spaced from the next succeeding film unit by a predetermined distance for insuring that the next successive film unit is properly registered at the focal plane upon a pod engaging the pressure applying means.

In still another illustrated embodiment, provision is made for folding the strip in a container therefor in such a manner that each film unit and its associated processing pod are generally coplanar when exiting the container, whereby the container can be dimensioned to snugly store a stack of film units therein as well as be positioned immediately adjacent the exposure station so as to thereby reduce the space of the photographic apparatus.

In another embodiment provision is made for a self-developing camera for use with a film assemblage including a plurality of individual film units of the self-developing type carried serially in spaced apart relationship on a strip wherein each film unit includes an image receiving portion, a pod of processing fluid associated therewith, and indexing means. The camera comprises means for storing the film assemblage film strip; means defining an exposure plane; and pressure applying means for rupturing the pod and spreading the processing fluid on an image forming portion of each associated film unit. The housing means allows a leading portion of the strip to be withdrawn from the camera in response to a pulling force so that an exposed film unit at the exposure plane is first advanced through the pressure applying means and then emerges from the camera. The indexing means of the succeeding pulled film unit cooperates with the means in the housing means for positively locating at the exposure plane an image portion of the next succeeding film unit leaving the storing means.

It is an object of the present invention to provide for improved photographic apparatus and methods especially for use with film of the self-developing type which is simplified in construction and assembly and, therefore, low in cost as well as sufficiently miniature in nature in order to insure the user benefits of a miniaturized camera and photograph.

The above and other objects and scope of the present invention will become apparent following reading a detailed description thereof when taken in conjunction with the accompanying drawings in which like reference numerals indicate like structure throughout the several views.

BRIEF DESCRIPTION OF THE DRAWINGS

FIG. 1 is a front schematic view of a camera made according to the principles of the present invention;

FIG. 2 is a plan schematic view of the camera illustrated in FIG. 1 with however a film tab extending outwardly therefrom;

FIG. 3 is an end view of the camera depicted in FIGS. 1 and 2;

FIG. 13 is a plan view of the loading door which is contemplated for use;

FIG. 14 is partial schematic view of the camera in combination with the film strip;

DETAILED DESCRIPTION

Figure 4:
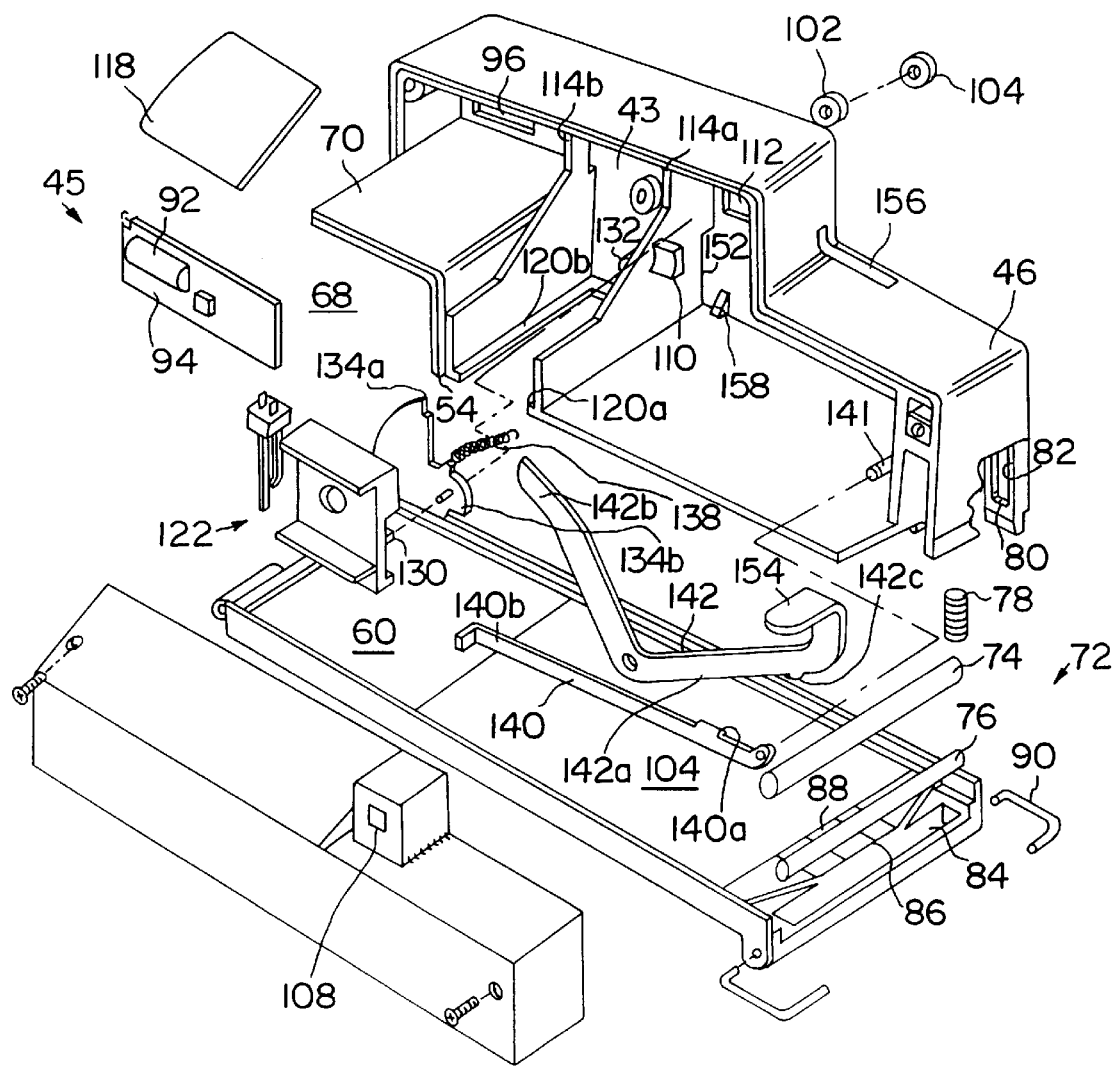
FIG. 4 is an exploded perspective of several components forming the camera.

Reference is initially made to FIGS. 1–6 for illustrating one preferred embodiment of a self-developing type photographic apparatus or camera 20. The camera 20 has, preferably, a miniature or compact construction and is manually operated for initiating processing of the film frames as well as for withdrawal of successive film frames from the camera. In one preferred embodiment, it is desired to have the camera 20 constructed in size carriable in, for example, a shirt pocket. The lighttight camera 20 is used, preferably, in combination with an improved film assemblage 22, such as shown in FIG. 7, which is more completely described and claimed in copending and commonly-assigned applications Ser. Nos. 60/040,254 and 60/040,797. Hence, only those features thereof necessary for understanding the present invention will be described in the present application. For a more detailed description of the film assemblage 22, reference is made to the last-noted applications which are incorporated herein as a part hereof.

Essentially, the film assemblage 22 includes an elongated strip 24 containing in an alternating arrangement a plurality of successively aligned and identical film frames 26; for example twelve frames. Each of the film frames 26 includes a plurality of discrete and generally rectangular film units 28, preferably of the integral self-developing type. Each of the units 28 includes coextensive positive and negative sheets which are generally rectangular in shape and are in superposed relationship to one another. In addition, there is provided a pair of elongated rails 30 sandwiched therebetween with each rail extending along a corresponding longitudinal edge thereof The film units 28 can have different size configurations, for example, 35 mm or APS sizes. At opposite ends of both units is coupled, such as adhesively, a pair of elongated superposed connecting sheets 32 and 34. The corresponding pairs of connecting sheet members 32 and 34 are laminated along their respective longitudinal margins for reasons to be explained. Before the sheet 34 is laminated to the sheet 32, a rupturable processing fluid pod 36 is adhesively secured in a generally transverse direction to the longitudinal extent of the sheet 34. Each of the pods 36 is secured at locations shown for each of the respective units 34. In addition, a trap means 38 is mounted to the sheet member 32. When the top sheet 34 is laminated to the lower sheet over the pod 36 and trap 38 at a trailing edge of the unit and between the units 28, the resulting construction allows for the passage of the processing fluid from the pod 34 to the unit 28 and from the unit to the trap 38. The construction of the foregoing assemblage is more completely described in the noted copending applications Ser. Nos. 60/040,254 and 60/040,797. Suffice it to say, however, when the pod is ruptured by a pressure applying means, a meniscus of the fluid leaving the pod travels into and between the spaced gap formed at a mouth of the film unit and then exits the film unit as it travels to the trap 38. In addition, the present invention contemplates that other film assemblages are usable. Perforations 39 are provided between a trailing edge of one frame 26 and a leading tab portion 41 of a succeeding film frame 26 to facilitate the automatic separation of the film frames. The invention contemplates other kinds of scored or weakened portions; such as semi-perforations.

Figure 7:
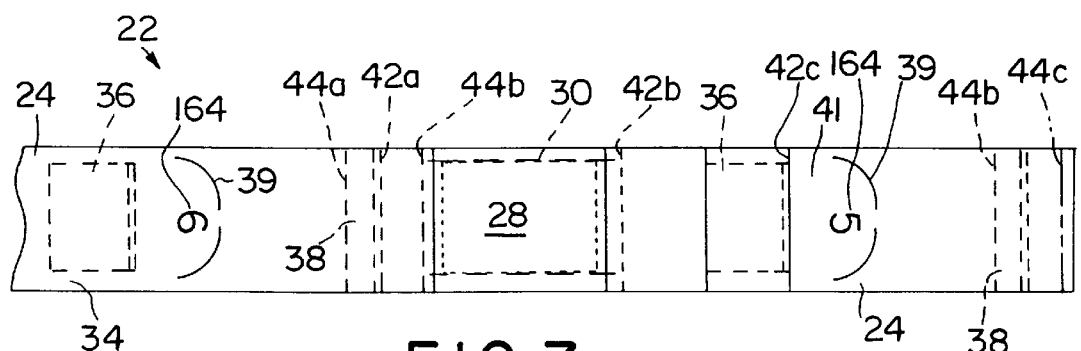
FIG. 7 is a schematic plan view of a film strip which can be used in connection with the camera of this invention.
Figure 8:
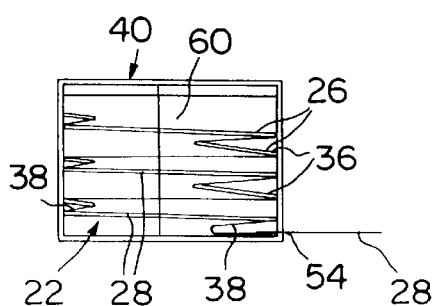
FIG. 8 is an enlarged schematic view of a film cassette which can be used in the camera of the present invention.
Figure 9:
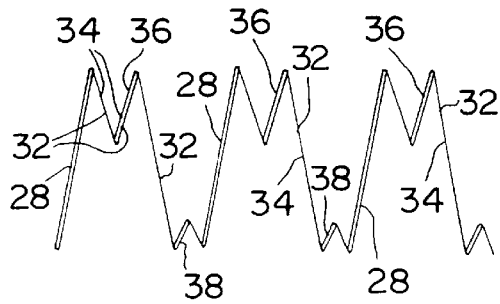
FIG. 9 is an enlarged view of a portion of film strip illustrating in greater detail the folding thereof.

With continued reference to FIGS. 7–9, the strip 24 is formed with a particular set of folds for effecting folding of the film frames 26, as is illustrated, in a compact manner such as within a film magazine or film container 40. In particular, the film assemblage 22 is folded so that the pod 36, film unit 28, and trap 38 for each corresponding film frame 26 are arranged generally coplanar as they are stored and as they exit from the container. This is advantageous for effecting a compact packaging arrangement of the film and ultimately reduces the size of the camera housing for receiving such components. In addition, the present invention contemplates that other folding arrangements of the film assemblages are usable. However in this embodiment for each film frame 26, there are so-called mountain or convex raised folded portions 42a–c as viewed in the FIG. 7 and so-called and so-called valley or concave folds as shown at the fold lines 44a, 44b and 44c. A more detailed description of the folding is set forth in copending and commonly-assigned patent application Ser. No. 60/040,797. As seen in FIG. 9, the film strip defining such a folding pattern forms a so-called "Wm." folding pattern because the configuration depicted in FIG. 9 appears similar to the script of "Wm". This folding configuration is, preferred, since it allows the strip to more easily bend and fold in the storing cassette as it is being withdrawn. The relatively stiff segments of the film unit, pod, and trap exit the box without bending or rotating. Of course, other folding configurations are contemplated for use with the film strip of this invention, but the illustrated version is preferred.

Reference is now made back to FIGS. 1–6 and FIGS. 13, 14 & 19 for describing the camera 20. In the illustrated embodiment, provision is made for a housing assembly 45 comprising a front cover member 46, a rear cover member 48, as well as a loading door 50. The rear cover 48 is secured to the front cover 46 as by threaded members 52. The housing assembly 42 can be made of a variety of low-cost materials, such as cardboard and suitable plastics. The loading door 50 is pivotally mounted at a bottom end of the assembled front and back covers 46 and 48, such as is illustrated for movement between closed and open conditions; whereby when in the latter condition, a film box or container 40 as well as a leader portion 58 of the film strip 24 can be easily loaded in the camera. Although the camera, preferably, has a loading door 50 for reloading purposes, it will be appreciated that the present invention contemplates that the film container 40 can be prepackaged during camera manufacture for disposal.

The film container 40 is mounted within a cavity 60 formed on the loading door 50 so that the exit slot 54 is in alignment with a narrow passage 62 formed in a transverse wall 64. The narrow passage inhibits passage of multiple film units being transferred to the film plane at a single time. Also, the film path is narrower along the edges as at 66 to protect the pods. The film container 40 is also retained in the film cavity 68 formed by the L-shaped housing retainer 70. The film container is initially mounted in the cavity 68 and the loading door retains the container upon closing.

Figure 5:
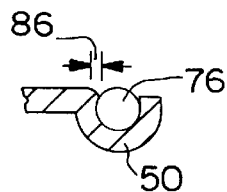
FIG. 5 is an enlarged and fragmented view of the lower roller of the pressure applying assembly being retained in a portion of a loading door.
Figure 6:
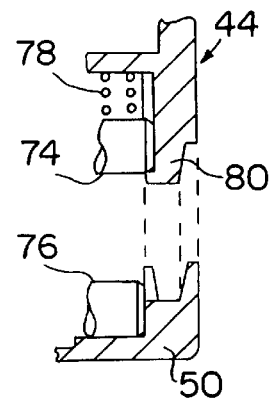
FIG. 6 is an enlarged, fragmented and partially exploded view of an end portion of the upper and lower spread rollers being retained.

Reference is now made to FIGS. 4–6 for illustrating one embodiment of a pressure applying means usable in the camera of this embodiment. The pressure applying means is a spread roller assembly 72 that is operable for rupturing the processing pods passing therebetween and spreading the fluid contents on the latent image to initiate processing thereof. The spread roller assembly 72 includes a pair of upper and lower spread rollers; 74 and 76. Preferably, the spread rollers 74, 76 can be made of cold rolled steel pins having a diameter of about 3/16 in. This is because the film strip is always in the nip or roll bite and there is no external masking on the film. Accordingly, the spread rollers can be low-cost and straight since there is no requirement to pregap the spread rollers and no grooves or texture are needed. The spread rollers 74 and 76 need not be freely rotatable in operation, but at least provide a nip for rupturing the pod as the film strip passes therebetween. It should be noted that instead of a pair of spread rollers, spreader bars or other appropriate spreading mechanisms can be used. Accordingly, one or both of the spread rollers can be replaced by fixed spreading structure as is known. The upper roller 74 is resiliently biased onto the lower roller 76 under the influence of a pair of roll compression springs 78; one each engaging opposite longitudinal end portions of the upper roller. In this embodiment, the springs 78 each provide about three (3) pounds force. The rollers 74 and 76 are retained in suitable cavities within the assembled housing assembly. For retaining the upper roller, a ledge 80 (FIG. 6) is formed in a recess in the front cover; and a corresponding ledge (not shown) is formed in the rear cover. To guide vertical movement of the upper roller 74 both the front and rear covers are provided with vertical tracks 82 (only one is shown). It will be understood that both the housing assembly portions act to releasably retain the end portion of the upper roller in place. The upper roller can be slightly longer than the lower roller. The lower roller 76 is mounted for rotation in an elongated well 84 formed in the loading door 50. The lower roller is retained in place by an overhanging portion 86 of a fixture 88 molded on the door. The spreader fixture 88 spreads uniformly the processing fluid after pod rupture. A locking bail 90 in a wire form is pivotally connected to the loading door 50 and cooperates with the assembled covers to releasably lock the door as well as serves load the springs 78.

Figure 18:
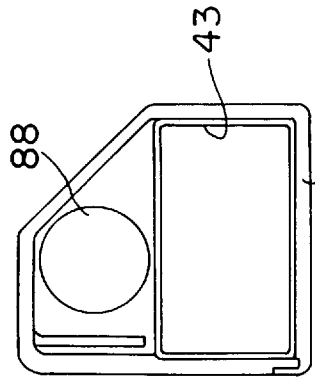
FIG. 18 is a schematic view of the present invention illustrating some of the components; and, FIG. 19 is a schematic view of the present invention illustrating some of the components.
Figure 19:
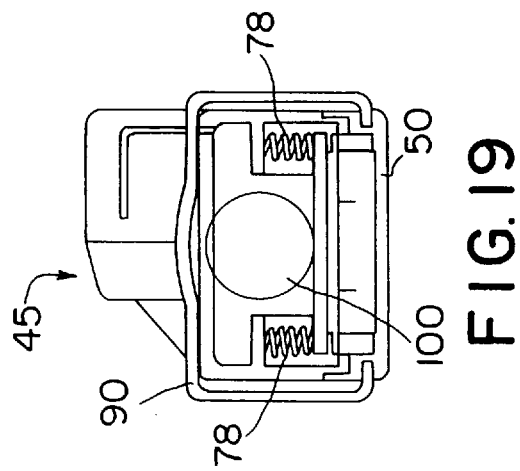

Reference is made to the FIG. 4, for illustrating an electronic strobe unit 92 that is mounted on an electric circuit board 94. The circuit board 94 is suitably mounted to a rear surface of the front cover 46 so that the strobe unit 92 is in registration with a front cover strobe window 96. A battery 88 provides a source of power and is mounted on the retainer wall 70 (see FIG. 18). A strobe capacitor 100 (FIG. 19) is mounted on an internal wall 102 of the front cover. It will be appreciated by those skilled in the art that the positioning of the circuit board, battery and strobe capacitor can be altered consistent with a variety of factors including spacing considerations. Since the camera is intended to be used predominantly for close-up photography there is not a requirement for a strobe and associated capacitor requiring significant power to operate effectively beyond four (4) feet.

Figure 17:
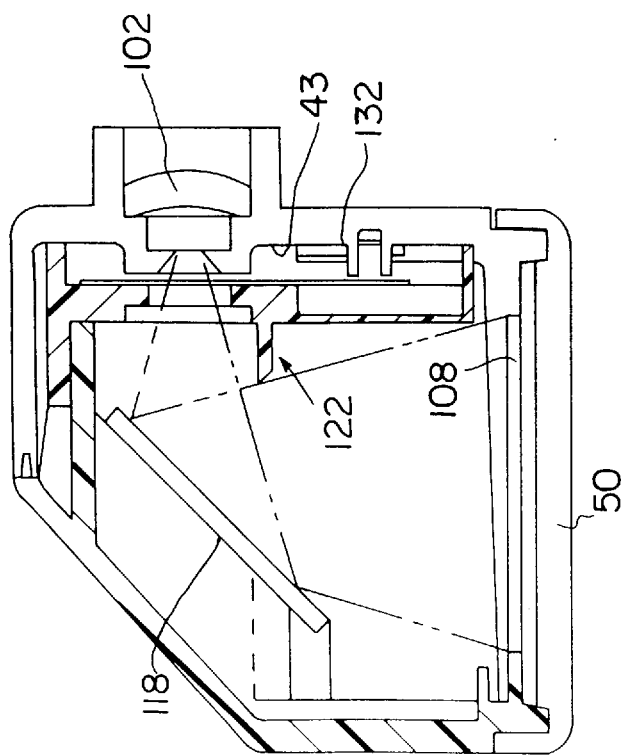
FIG. 17 is an enlarged cross-sectional schematic view of illustrating several components of the camera.

Continued reference is made to FIG. 4 for depicting a taking lens 102 that directs the image forming scene light to a film plane 104 formed on the loading door. The taking lens 102 is intended to take close-up photographs and is secured to the front cover by a lens retainer 106. A viewfinder 107 includes a window having a rear element 108 press-fit therein and a front element 110 press-fit in registration with a viewfinder window 112 on the front cover. The front cover includes a pair of rearwardly extending retaining walls 114a and 114b which, in part, define an exposure chamber 116. As is better shown in FIG. 17 a mirror 118 is mounted on and secured to downwardly sloped surfaces on the walls 114a, b, for directing the image forming scene light to the film plane 108. The retaining walls 114a, b have feet 120a, 120b; respectively, which define, in part, a field stop for the film unit at the focal plane. The feet 120a, 120b extend across the image plane image and thereby serves to form borders for each image. This minimizes the requirement on the film to provide masks for borders. Additionally, the walls 114a, b serve to baffle light.

Figure 10:
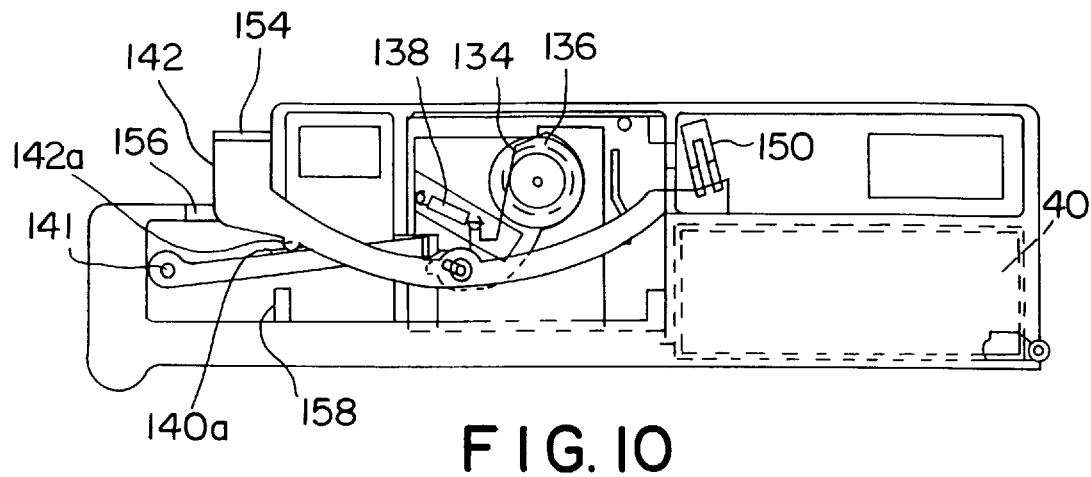
FIGS. 10–12 illustrate a release lever and shutter arrangement in three positions of operation including an initial at rest position, an intermediate position and a lower position.

Reference is made to FIGS. 4, 13, 15, 16A–C for illustrating the shutter blade assembly 122 which is of the bounce shutter type; but other shutter systems can be used. The shutter blade assembly 122 is mounted to the interior wall 43 of the front cover 46 and assists in light sealing the focal cone. Included in the shutter blade assembly 122 is a main body 124 defining an aperture 126 for passing light from an exposure stop aperture 128 in the front cover to the mirror 118. A downwardly extending protrusion 124a acts to seal the focal cone while top flange 124b locates the main body and forms a labyrinth seal, while a flare baffle 124c assists in defining a focal cone. A shutter blade pivot 130 on the body 124 nestles into a molded post 132 (FIG. 13) and supports and retains a shutter blade 134 which is mounted on the pivot for pivotal movement. The shutter blade 134 includes a stop 134a, a slot 134b, a hammer engaging extension 134c, and a tab hook 134d. The stop 134a is intended to strike a shelf stop 136 upon return to the shutter's closed condition. The tab hook 134d is attached to an extension spring 138 to allow the latter to bias the shutter blade to its at rest and closed condition. The slot 134b is adapted to slide over the pivot 130 and the extension spring 138 biases the shutter so that the shaft 130 is bottomed in the slot 134b; as is shown in FIG. 10.

The shutter blade assembly 122 is operatively associated with a shutter blade hammer 140 and a manually actuated release lever 142. The hammer 140 is an elongated arm pivoted on post 144 (FIG. 4) and biased by a spring 146 (FIG. 16A) to its upward position, such as shown in FIG. 10. The spring-biased hammer 140 is loosely pivotally mounted on the post 144 and is allowed limited movement along the axial direction of the shaft for reasons which become apparent after the hammer is cammed out of a plane of downward movement. The release lever 142 is mounted on the post 132 and is coaxial with the axis of rotation of the shutter blade for compactness. A release spring lever 148 (FIG. 16C) is attached to one arm 142a of the release lever in order to bias a distal end of the arm 142b downwardly and normally out of engagement with a strobe charging switch 150. It is also contemplated that the arm 142 can be shortened and instead actuate a strobe switch closer to its pivot for effecting an even more compact relationship of camera components. An elongated slot 152 (FIG. 4) in the retaining wall 114a allows pivotal movement of the release lever 142 therethrough, whereby a finger button 154 is biased upwardly through an opening 156 in the front cover.

Figure 11:
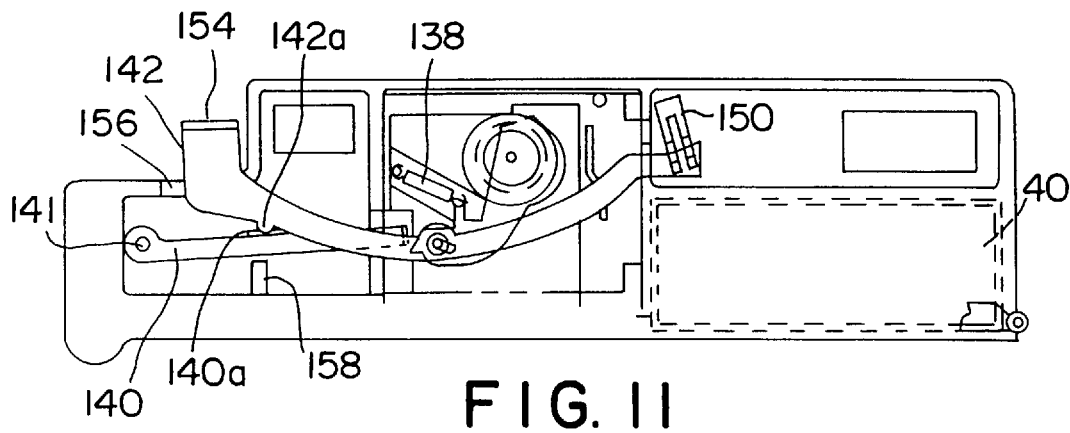
Figure 12:
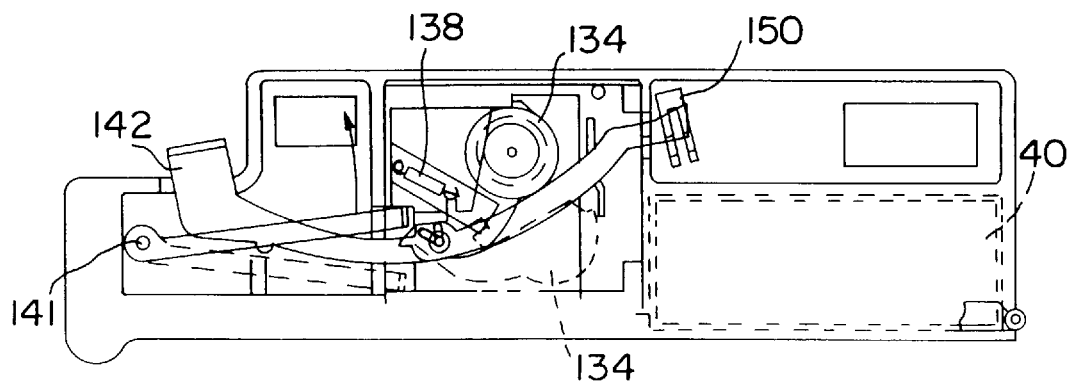
Figure 15:
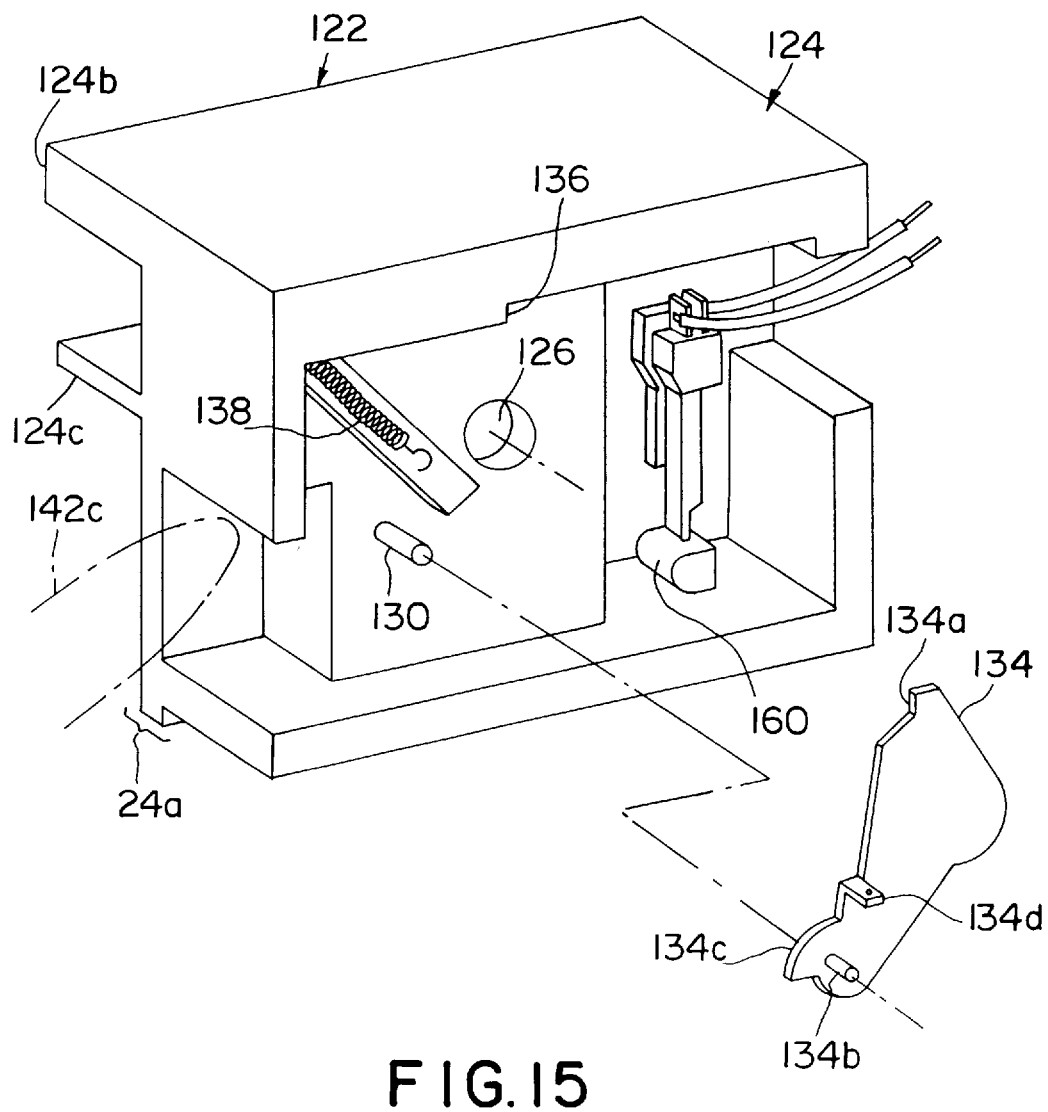
FIG. 15 is a perspective view of the camera shutter arrangement in combination with a release lever.
Figure 16A:
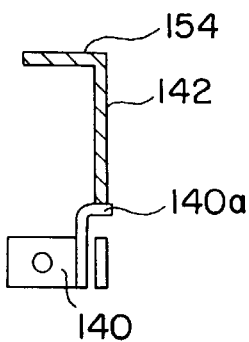
FIGS. 16A and 16B are schematic representations of the shutter and strobe charging operation of the present invention.
Figure 16B:
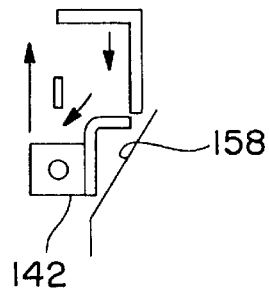
Figure 16C:
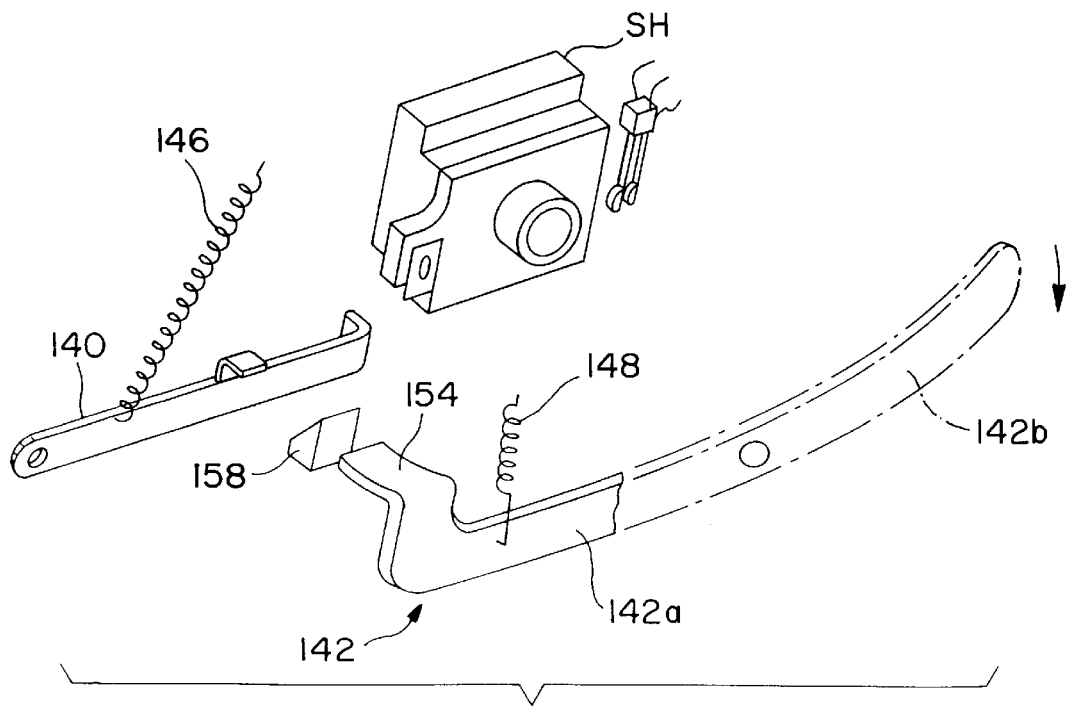
FIG. 16C is an exploded perspective of several components of the camera.

For actuating the release lever 142 and thereby effecting exposure and strobe firing continued reference is made primarily to FIG. 4, 10–12 & 16A–C. The finger tab 154 of the release lever is pressed downwardly against the bias of its spring 148. Accordingly, the switch engaging end of the arm portion 142b actuates the strobe charging switch 150 for commencing charging of the strobe capacitor. Continued pressing causes the release lever 142 to have its extending tab 142c engage a tab 140a on the hammer 140 and correspondingly pivot it downwardly as well. As the hammer 140 is driven downwardly as shown in FIGS. 11 and 12, the hooked end 140b cams over the shutter tab 142c. As the release lever continues downward movement, the hammer 140 engages an inclined cam 158 molded in the front cover 46. In response, the hammer 140 is displaced axially away from the cam 158 and correspondingly free of the release lever 142; as seen in FIG. 16B. It will be recalled that there is a loose fit of the hammer on the shaft 141. Under the influence of the spring 146, the hammer 140 is pivoted in the opposite manner such that the hooked end 140b returns to its initial starting position (seen in phantom lines in FIG. 15) above the shutter tab 134b. During this return movement, as the hammer 140 returns to its original position, its hooked end 140b trips the shutter blade tab thereby allowing the shutter blade to move to its open position. This shutter 134 being of the well-known bounce type effects an exposure when the shutter blade moves from its light blocking condition to its open condition and returns to its the original blocking condition whereat the stop 134a engages the shelf 136. The bounce shutter will engage a strobe fire switch 160. With this kind of shutter, the blade during movement to the open position will close the strobe firing switch 160, thereby discharging the capacitor and thus firing the strobe while the shutter is open. The blade during return to the closed position will open the strobe firing switch.

After the above description of the construction, the operation of the camera is self-evident. However, the following brief description is given as a supplement such description. In order to capture an image on the film units, the button 154 is depressed downwardly. As noted, the combination of the release lever and hammer effect a charging of the strobe when the switch 150 is actuated and then discharge the strobe when the shutter is tripped by the hammer and the strobe fire switch 160 is actuated by the shutter. Thereafter, under the influence of the springs the shutter blade 134 returns to its closed condition, thereby completing an exposure of the film at the exposure station. The release lever 140 is also returned to its original condition set for another exposure.

For processing the just exposed film frame, an operator pulls on a tab extending an appropriate distance from the camera. Accordingly, when the tab is pulled, the film unit which was just exposed is advanced through the spread rollers 74 and 76 for initiating processing of the latent. Outward displacement of the film strip from the housing exit slot 164, which may have an appropriate light seal member (not shown), continues until the next succeeding pod engages the spread rollers and indexes the succeeding film unit at the focal plane. In addition, the resistance encountered will create a drag on the strip 24 greater than the force holding the adjoining film units together at the perforations 39. As a consequence, the film frame 26 pulled from the camera automatically separates from the one remaining in the camera. In this connection, each film frame 26 is of such a size that the perforations are located so as to allow a tab of the remaining frame protrude a sufficient distance to be pulled. Each film frame tab 41 carries indicia 164 thereon indicating, for instance a numbering sequence selected to indicate the number of film frames remaining or exposed. The resistance of the pod will be overcome on the next pull. It will be appreciated that upon advancement of the film unit from the camera, the next succeeding film unit is automatically indexed from the container 40 along the surface 104 on the loading door 50 to the exposure station. As noted to facilitate the indexing or aligning of the pod, the pods are appropriately spaced with respect to the film units so that as the former engage the pressure applying rollers, the latter are located at the film plane ready for the next exposure. As noted, while a pod is shown for effecting an indexing action, the present invention would be able to index the next succeeding film unit at the focal plane by some other indexing mechanism as bumps or protrusions, preferably, added to the film assemblage, such as described in copending and commonly-assigned patent application Ser. No. 60/040,797. Although the pressure applying rollers are the structure which the pods engage for indexing, the present invention contemplates that the pods may engage other similar structure which would brake movement of the pod and also allow separation of the film frames automatically. Although the film advancement is generally straight, the present invention envisions that the film can be stored in different locations and advanced in other than generally straight paths as is done in the present embodiment.

Although several specific and preferred methods and apparatus of the present invention have been shown and described above, other variations of the present invention will become apparent to those skilled in the art. The scope of the invention is therefore not limited to the specific forms shown and described but rather is indicated by the claims below.

What is claimed is:

1. A method of processing a film assemblage including a plurality of individual self-developing integral film units carried serially in spaced apart relationship on a film strip in a photographic apparatus, said method comprising the steps of: applying a withdrawing force on a leading portion of the strip so that an exposed film unit at an exposure station is first advanced through pressure applying means within the photographic apparatus and then emerges from the photographic apparatus; and, indexing generally simultaneously therewith the next successive integral film unit to the exposure station from a position remote from the exposure station; said indexing step is accomplished by indexing means on the strip cooperating with the pressure applying means; the withdrawing force is applied to the strip externally of the photographic apparatus.

2. The method of claim 1 comprising the steps of: providing a rupturable processing fluid pod for each of the film units; and folding the strip in a container therefor in such a manner that each film unit and associated pod is generally coplanar when exiting the container, whereby the container can be dimensioned to snugly store a stack of film units therein as well as be positioned immediately adjacent the exposure station so as to reduce the space of the photographic apparatus.

3. The method of claim 1 further comprising the step of providing the strip with perforations at spaced intervals between each of the film units, wherein the perforations are frangible so that in response to the indexing means engaging the pressure applying means during application of the withdrawal forces the perforations allowing automatic separation of each of the successive emerging film units from the immediately proceeding film unit.

4. The method of claim 2 wherein said indexing step is achieved by each processing fluid pod acting as the indexing means for engaging the pressure applying means.

5. The method of claim 2 wherein said indexing step includes spacing each of the pods from the next succeeding film unit by a distance which insures that the next unit is properly registered at the exposure station upon a pod engaging the pressure applying means.

6. The method of claim 2 wherein each of the withdrawn film units exit the container and emerge from the housing along a generally straight path.

7. A self-developing camera for use with a film assemblage including a plurality of individual film units of the self-developing type carried serially in spaced apart relationship on a strip wherein each film unit includes an image receiving portion, a pod of processing fluid associated therewith, and indexing means, said camera comprising: means for storing the film strip; means defining an exposure station; pressure applying means for rupturing the pod and spreading the processing fluid on an image forming portion of each associated film unit; said housing means allowing a leading portion of the strip to be withdrawn from the camera in response to a pulling force so that an exposed film unit at the exposure station is first advanced through the pressure applying means and then emerges from the camera; and, the indexing means of the succeeding pulled film unit cooperates with the pressure applying means for positively locating at the exposure station an image portion of the next succeeding film unit leaving the storing means; wherein the strip has perforations formed therein at spaced intervals between each of the film units, wherein the perforations are frangible and in response to the indexing means engaging the pressure applying means during application of the withdrawal forces it allows automatic separation of each of the emerging film units from the next succeeding film unit moving to the exposure station.

8. The camera of claim 7 wherein the film assemblage strip is folded in the storing means in such a manner that each image receiving portion and pod associated with a film unit is generally coplanar with respect to each other when exiting the storing means, whereby the storing means can be dimensioned to snugly store a stack of film units therein as well as allow the stack to be positioned immediately adjacent the exposure station thereby reducing the size of the camera.

9. The camera of claim 7 wherein the indexing means is a processing fluid pod on each of the film units.

10. The camera of claim 7 wherein said pods are spaced from the next succeeding film unit by a distance which insures that the next succeeding image forming portions is properly registered at the exposure station upon a pod engaging the pressure applying means.

11. The camera of claim 7 wherein the self-developing film units are integral self-developing units.

12. The camera of claim 8 wherein an exit slot is defined in the storing means and an exit slot of said camera is arranged to allow the withdrawn film units to exit the camera and emerge from the storing means in a generally straight path.

* * * * *